(12) United States Patent
Ito

(10) Patent No.: US 11,137,957 B2
(45) Date of Patent: Oct. 5, 2021

(54) INFORMATION PROCESSING APPARATUS HAVING A PLURALITY OF LINES, CONTROL METHOD THEREFOR, AND STORAGE MEDIUM

(71) Applicant: CANON KABUSHIKI KAISHA, Tokyo (JP)

(72) Inventor: Yuki Ito, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/126,297

(22) Filed: Sep. 10, 2018

(65) Prior Publication Data

US 2019/0079710 A1  Mar. 14, 2019

(30) Foreign Application Priority Data

Sep. 14, 2017  (JP) .............................. JP2017-176992

(51) Int. Cl.
  *G06F 3/12*  (2006.01)
  *H04N 1/00*  (2006.01)
  *H04W 4/80*  (2018.01)
  *H04W 76/11*  (2018.01)
  *G06K 15/02*  (2006.01)

(52) U.S. Cl.
  CPC .......... *G06F 3/1231* (2013.01); *G06F 3/1222* (2013.01); *G06F 3/1236* (2013.01); *H04N 1/00315* (2013.01); *G06F 3/1292* (2013.01)

(58) Field of Classification Search
  None
  See application file for complete search history.

(56) References Cited

U.S. PATENT DOCUMENTS

| 9,836,260 B2 | 12/2017 | Iwauchi | |
| 2007/0229518 A1* | 10/2007 | Kii | G06F 3/0481 345/520 |
| 2009/0150515 A1* | 6/2009 | Kung | G06F 1/3203 709/217 |

(Continued)

FOREIGN PATENT DOCUMENTS

| JP | 2012138074 A | 7/2012 |
| JP | 2014033367 A | 2/2014 |

(Continued)

OTHER PUBLICATIONS

Office Action issued in Korean Appln. No. 10-2018-0106415 dated Feb. 24, 2021.

(Continued)

*Primary Examiner* — Beniyam Menberu
(74) *Attorney, Agent, or Firm* — Rossi, Kimms & McDowell LLP

(57) ABSTRACT

An information processing apparatus capable of providing address information of a line desired by a user. The information processing apparatus causes the user to select a line corresponding to the address information to be set in the near field wireless communication information, and sets the address information of the selected line in the near field wireless communication information, so as to transmit the near field wireless communication information, in which the address information of the line desired by the user is set, by near field wireless communication.

14 Claims, 15 Drawing Sheets

(56) References Cited

U.S. PATENT DOCUMENTS

| | | | | |
|---|---|---|---|---|
| 2011/0188079 A1* | 8/2011 | Suzuki | .................... | G06F 3/12 358/1.15 |
| 2013/0148162 A1* | 6/2013 | Park | .................... | G06K 15/00 358/1.15 |
| 2013/0250355 A1* | 9/2013 | Takamiya | ............. | G06F 3/1236 358/1.15 |
| 2013/0260683 A1* | 10/2013 | Suzuki | ................. | H04W 76/10 455/41.1 |
| 2014/0092421 A1* | 4/2014 | Shibata | ............. | H04N 1/00233 358/1.14 |
| 2014/0094209 A1* | 4/2014 | Ren | .................... | H04W 60/00 455/515 |
| 2014/0240773 A1* | 8/2014 | Suzuki | ................. | G06F 3/1236 358/1.15 |
| 2014/0240778 A1* | 8/2014 | Itogawa | ............... | G06F 3/1292 358/1.15 |
| 2014/0293333 A1* | 10/2014 | Asai | .................... | G06F 3/1236 358/1.15 |
| 2015/0062625 A1* | 3/2015 | Kong | ................. | G06F 3/1231 358/1.15 |
| 2015/0189023 A1* | 7/2015 | Kubota | .............. | G06F 16/9566 455/7 |
| 2015/0189025 A1* | 7/2015 | Banno | ................. | G06F 3/1204 709/224 |
| 2015/0195161 A1* | 7/2015 | Tanji | .............. | H04W 4/70 709/224 |
| 2015/0359021 A1* | 12/2015 | Tsujii | ................. | H04W 4/80 455/41.1 |
| 2015/0382136 A1* | 12/2015 | Mihira | ................. | H04W 12/06 455/41.1 |
| 2016/0004498 A1* | 1/2016 | Iwauchi | ............ | H04N 1/00251 358/1.15 |
| 2016/0142581 A1* | 5/2016 | Morita | ................... | H04W 4/80 358/1.13 |
| 2017/0034768 A1* | 2/2017 | Kimura | ................... | H04L 67/14 |
| 2017/0039012 A1* | 2/2017 | Minegishi | ............ | G06F 3/1222 |
| 2017/0131953 A1* | 5/2017 | Inoue | .................... | G06F 3/1204 |
| 2017/0156172 A1* | 6/2017 | Yokoyama | ........... | H04W 68/12 |
| 2018/0035480 A1* | 2/2018 | Mihira | ................. | G06F 3/1292 |

FOREIGN PATENT DOCUMENTS

| | | | |
|---|---|---|---|
| JP | 2016018283 A | 2/2016 | |
| JP | 2016157428 A | 9/2016 | |
| JP | 2016181152 A | 10/2016 | |
| JP | 2017037362 A | 2/2017 | |
| JP | 2017085379 A | 5/2017 | |
| JP | 2017143389 A | 8/2017 | |
| JP | 2017147595 * | 8/2017 | .............. H04N 1/00 |

OTHER PUBLICATIONS

Office Action issued in Korean Appln. No. 10-2018-0106415 dated Jun. 16, 2021.

Office Action issued in Japanese Appln. No. 2017-176992 dated Jul. 20, 2021.

* cited by examiner

FIG. 8

| TITLE | | | VALUE |
|---|---|---|---|
| Header | | | Advertise_IND |
| Advertise Address | | | 000085ac21ac |
| Advertise Payload | AD Element 1 | type | IPAddress |
| | | data | 172.24.1.100 |
| | AD Element 2 | type | DeviceName |
| | | data | "PrinterNameA" |

| TITLE | | | VALUE |
|---|---|---|---|
| Header | | | Advertise_IND |
| Advertise Address | | | 000085ac21ac |
| Advertise Payload | AD Element 1 | type | VendorName |
| | | data | "CANON" |
| | AD Element 2 | type | DeviceName |
| | | data | "PrinterNameA" |

| ID | VALUE |
|---|---|
| 1 | IPAddress |
| 2 | SSID |
| 3 | SecurityType |
| 4 | SecurityKey |

INFORMATION PROCESSING APPARATUS HAVING A PLURALITY OF LINES, CONTROL METHOD THEREFOR, AND STORAGE MEDIUM

BACKGROUND OF THE INVENTION

Field of the Invention

The present invention relates to an information processing apparatus, a control method therefor, and a storage medium.

Description of the Related Art

Multifunction printers (MFPs) as information processing apparatuses for performing near field wireless communication such as near field communication (NFC) and Bluetooth (registered trademark) Low Energy (hereinafter referred to as "BLE") communication are known. Near field wireless communication is mainly used for pairing and handover of communication information. For example, when a mobile terminal having a near field wireless communication function approaches an MFP, the MFP transmits near field wireless communication information including address information such as an Internet Protocol (IP) address and a media access control (MAC) address of the MFP to the mobile terminal that has approached by near field wireless communication (for example, see Japanese Laid-Open Patent Publication (kokai) No. 2016-018283). Based on the address information included in the received near field wireless communication information, the mobile terminal performs wireless communication with the MFP, such as Wi-fi that allows communication at a higher speed than the above-mentioned near field wireless communication, and for example, transmits, to the MFP, print data which gives instruction for execution of printing.

In recent years, an MFP having a plurality of lines have been developed, and this MFP can properly selectively use a plurality of different networks. For example, this MFP uses one network in a line and uses another network different from the one network in another line. In this MFP, address information is set for each line, and the address information set for lines are different from one another. Also in a case where this MFP transmits the address information to the mobile terminal by near field wireless communication, it is necessary to set the address information as near field wireless communication information. However, only one piece of address information can be set in the near field wireless communication information. Therefore, it is necessary for the MFP to determine specified address information to be set in the near field wireless communication information from address information of a plurality of lines.

However, since the address information of the line desired by a user depends on a use purpose of the information processing apparatus and a security policy of an environment in which the information processing apparatus is used. Therefore, the MFP cannot specify the address information to be set in the near field wireless communication information. That is, the conventional MFP cannot provide the address information of the line desired by the user.

SUMMARY OF THE INVENTION

The present invention provides an information processing apparatus capable of providing address information of a line desired by a user, a control method therefor, and a storage medium.

Accordingly, the present invention provides an information processing apparatus that includes a plurality of lines and transmits near field wireless communication information, in which address information of one of the plurality of lines is set, by near field wireless communication, the information processing apparatus comprising a selection unit configured to cause a user to select a line corresponding to the address information to be set in the near field wireless communication information, and a setting unit configured to set the address information of the selected line in the near field wireless communication information.

The present invention can provide the address information of the line desired by the user.

Further features of the present invention will become apparent from the following description of exemplary embodiments (with reference to the attached drawings).

BRIEF DESCRIPTION OF THE DRAWINGS

FIG. 8 is a diagram for describing a structure of an advertising packet transmitted from the MFP in FIG. 1.

FIGS. 10A and 10B are diagrams for describing a structure of the advertising packet transmitted from the MFP in FIG. 1.

DESCRIPTION OF THE EMBODIMENTS

The present invention will now be described in detail below with reference to the accompanying drawings showing embodiments thereof.

Figure 1:
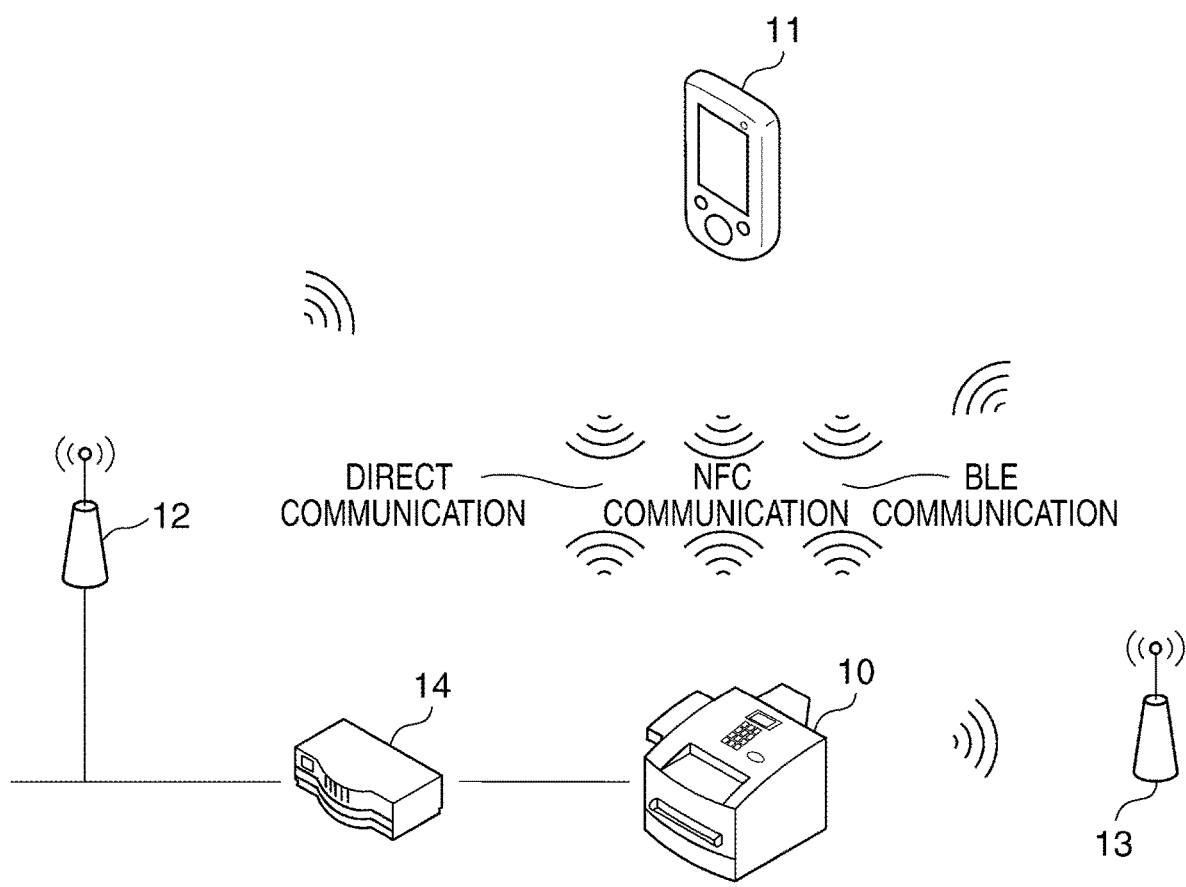
FIG. 1 is a diagram for describing a network configuration of an MFP as an information processing apparatus according to embodiments of the present invention.

FIG. 1 is a diagram for describing a network configuration of an MFP 10 as an information processing apparatus according to embodiments of the present invention. The MFP 10 is connected to a router 14 via a wired LAN, and the router 14 is connected to an access point 12 via a wired LAN. The MFP 10 performs wired LAN communication with a mobile terminal 11 via the router 14 and the access point 12. The MFP 10 is connected to an access point 13 via a wireless LAN. The MFP 10 performs wireless LAN communication with the mobile terminal 11 via the access point 13. Furthermore, the MFP 10 performs direct wireless communication (hereinafter referred to as "wireless direct communication") or near field wireless communication directly with the mobile terminal 11. The near field wireless communication is NFC communication and BLE communication.

The MFP 10 has a plurality of lines. As one example, the present embodiment will describe a configuration in which the MFP 10 has one primary line and one secondary line. Also, the MFP 10 can simultaneously operate a wired infrastructure using the access point 12 connected via a wired LAN and a wireless infrastructure using the access point 13 connected via a wireless LAN. The MFP 10 uses one of the wired infrastructure and the wireless infrastructure as the primary line, and the other as the secondary line. Different IP addresses are assigned to respective lines. Also, in the MFP 10, an IP address different from the IP address of each line is assigned for the wireless direct communication. Hereinafter, the IP address assigned to the primary line is referred to as a primary line IP address. The IP address assigned to the secondary line is referred to as a secondary line IP address. The IP address assigned to the wireless direct communication is referred to as a wireless direct IP address.

Figure 2:
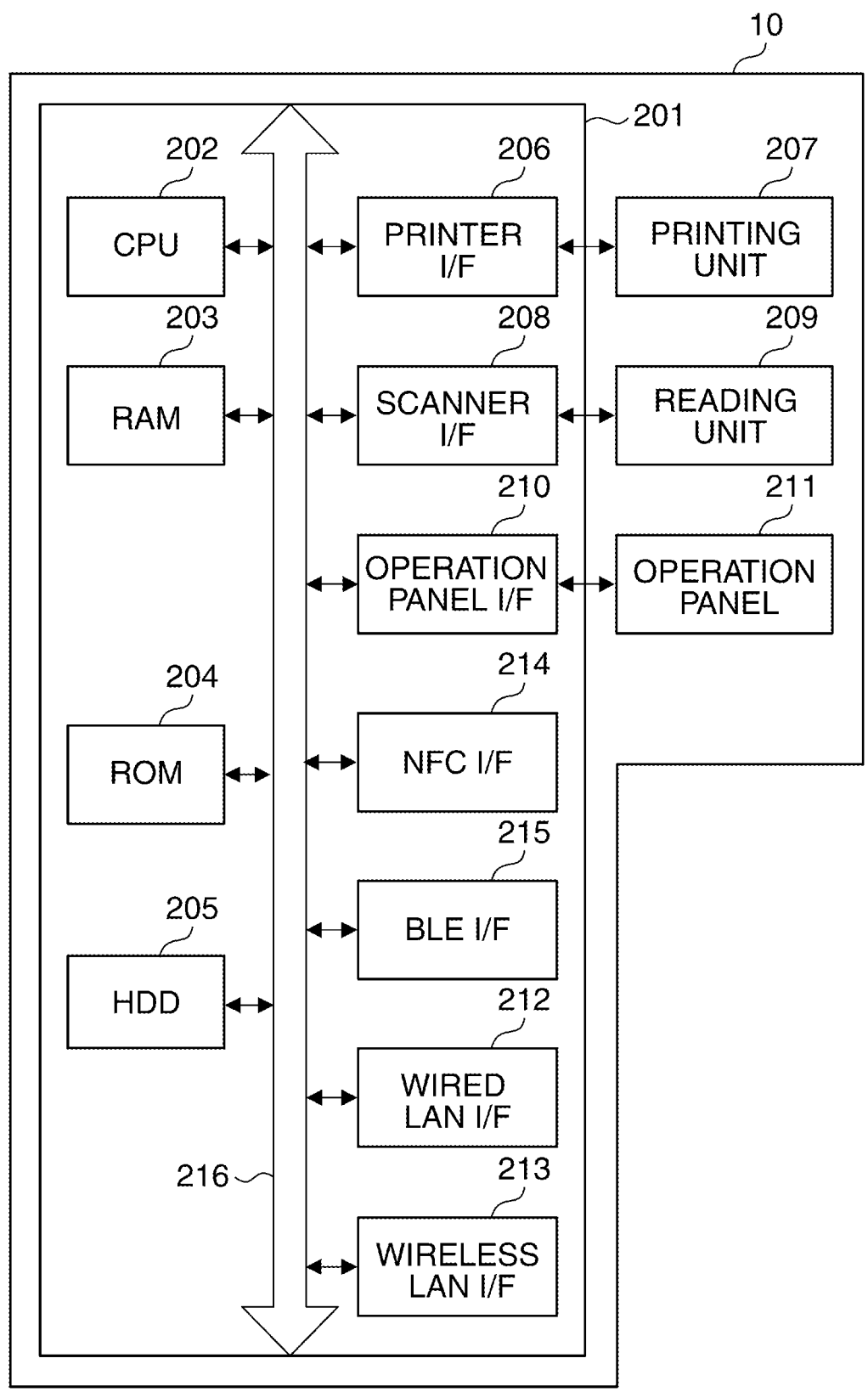
FIG. 2 is a block diagram schematically showing a hardware configuration of the MFP in FIG. 1.

FIG. 2 is a block diagram schematically showing a hardware configuration of the MFP 10 in FIG. 1.

In FIG. 2, the MFP 10 includes a control unit 201, a printing unit 207, a reading unit 209, and an operation panel 211. The control unit 201 is connected to the printing unit 207, the reading unit 209, and the operation panel 211. Also, the control unit 201 includes a CPU 202, a RAM 203, a ROM 204, an HDD 205, a printer I/F 206, a scanner I/F 208, and an operation panel I/F 210. Also, the control unit 201 includes a wired LAN I/F 212, a wireless LAN I/F 213, an NFC I/F 214, and a BLE I/F 215. The CPU 202, the RAM 203, the ROM 204, the HDD 205, the printer I/F 206, and the scanner I/F 208 are connected to one another via a system bus 216. In addition, the operation panel I/F 210, the wired LAN I/F 212, the wireless LAN I/F 213, the NFC I/F 214, and the BLE I/F 215 are also connected to one another via the system bus 216.

The MFP 10 is an image forming apparatus that performs image forming processing. The control unit 201 controls an operation of the entire MFP 10. The CPU 202 performs each control by reading and executing a control program stored in the ROM 204. The RAM 203 is used as a work area for the CPU 202 and as a temporary storage area for each data. The ROM 204 stores control program and the like to be executed by the CPU 202. The HDD 205 stores data, programs, and setting information. The printer I/F 206 outputs an image signal for performing printing processing to the printing unit 207. The printing unit 207 performs printing processing based on the received image signal. The scanner I/F 208 transfers a read image signal output and received from the reading unit 209 to the CPU 202. The reading unit 209 reads a document and outputs a read result as the read image signal to the scanner I/F 208. The operation panel I/F 210 connects the operation panel 211 and the control unit 201. The operation panel 211 includes a liquid crystal display unit (not shown) having a touch panel function, a keyboard (not shown), and the like, and receives an instruction to change each setting of the MFP 10 and the like.

The wired LAN I/F 212 performs wired LAN communication with the mobile terminal 11 or the like by using the wired infrastructure. The wireless LAN I/F 213 performs wireless communication that allows communication at a higher speed than near field wireless communication with an external device (not shown). For example, the wireless LAN I/F 213 performs wireless LAN communication with the mobile terminal 11 by using the wireless infrastructure. Also, the wireless LAN I/F 213 performs wireless direct communication with the mobile terminal 11. The NFC I/F 214 performs NFC communication with the mobile terminal 11 or the like. For example, the NFC I/F 214 transmits address information on the MFP 10 such as the IP address and MAC address of each line to the mobile terminal 11 by NFC communication. The BLE I/F 215 performs BLE communication with the mobile terminal 11 or the like. For example, the BLE I/F 215 transmits the address information to the mobile terminal 11 by BLE communication.

Figure 3A:
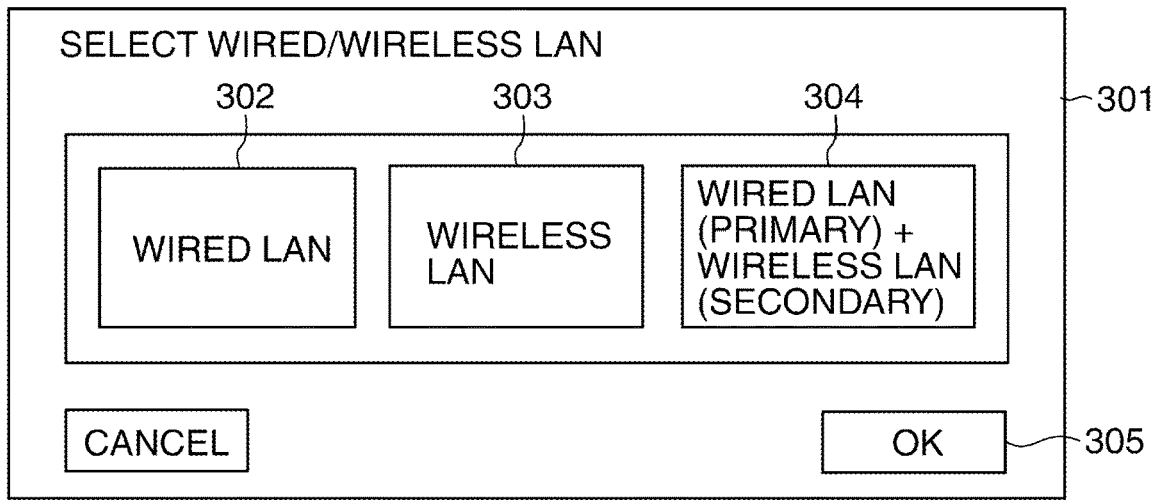
FIGS. 3A to 3C are diagrams each showing one example of an operation screen displayed on an operation panel in FIG. 2.
Figure 3B:
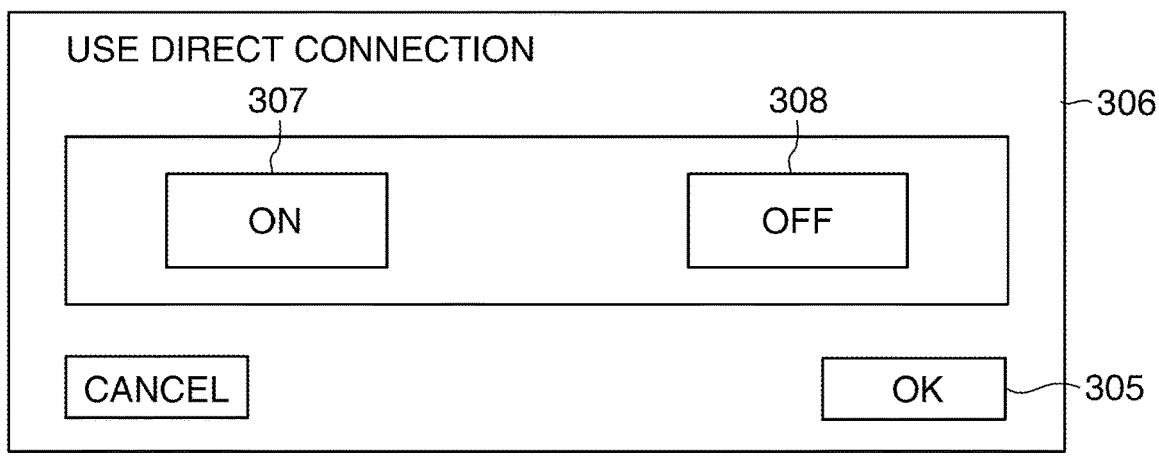
Figure 3C:
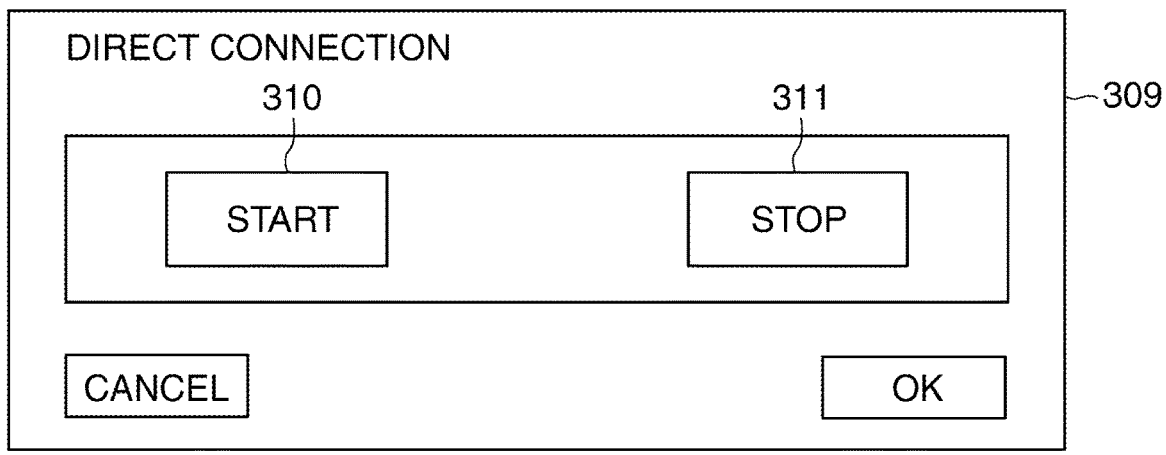

FIGS. 3A to 3C are diagrams each showing one example of an operation screen displayed on the operation panel 211 in FIG. 2. FIG. 3A shows a LAN selection screen 301, FIG. 3B shows a wireless direct setting screen 306, and FIG. 3C shows a wireless direct execution instruction screen 309.

The LAN selection screen 301 is a screen for setting the use of the wired infrastructure and the wireless infrastructure. The LAN selection screen 301 includes a plurality of operation buttons, that is, a wired LAN button 302, a wireless LAN button 303, a wired LAN (primary)+wireless LAN (secondary) button 304, and an OK button 305. The user can select one operation button from among the wired LAN button 302, the wireless LAN button 303, and the wired LAN (primary)+wireless LAN (secondary) button 304.

In a case where the wired LAN button 302 is selected by the user, a wired LAN mode is set in the MFP 10. In the wired LAN mode, among the wired infrastructure and the wireless infrastructure, only the wired infrastructure is used. In a case where the wireless LAN button 303 is selected by the user, a wireless LAN mode is set in the MFP 10. In the wireless LAN mode, among the wired infrastructure and the wireless infrastructure, only the wireless infrastructure is used. In a case where the wired LAN (primary)+wireless LAN (secondary) button 304 is selected by the user, a multiple line mode is set in the MFP 10. In the multiple line mode, both the wired infrastructure and the wireless infrastructure are used. Specifically, in the multiple line mode, the wired infrastructure is used as the primary line and the wireless infrastructure is used as the secondary line. When the OK button 305 is selected, a setting value indicating the mode set through the LAN selection screen 301 is stored in the HDD 205. It should be noted that in the present embodiment, specified restrictions are put on the secondary line, the specified restrictions such as communication cannot be made with a communication device connected via a gateway, or only a printing function is available.

The wireless direct setting screen 306 is a screen for enabling or disabling the wireless direct communication. The wireless direct setting screen 306 includes an ON button 307 and an OFF button 308. In a case where the ON button 307 is selected by the user, a wireless direct communication function is enabled, and the wired infrastructure and the wireless infrastructure are disabled, in the MFP 10. This allows the MFP 10 to perform the wireless direct communication, which is started in response to a start instruction received through the wireless direct execution instruction screen 309. In a case where the OFF button 308 is selected by the user, the wireless direct communication function is disabled in the MFP 10. This prohibits the MFP 10 from performing the wireless direct communication.

The wireless direct execution instruction screen 309 is a screen for receiving the start instruction and a stop instruction of the wireless direct communication. The wireless direct execution instruction screen 309 includes a start button 310 and a stop button 311. In a case where the start button 310 is selected by the user, the MFP 10 starts the wireless direct communication with a communication device such as the mobile terminal 11. In a case where the stop button 311 is selected by the user, the MFP 10 stops the wireless direct communication which has been performed with the mobile terminal 11 or the like.

Figure 4:
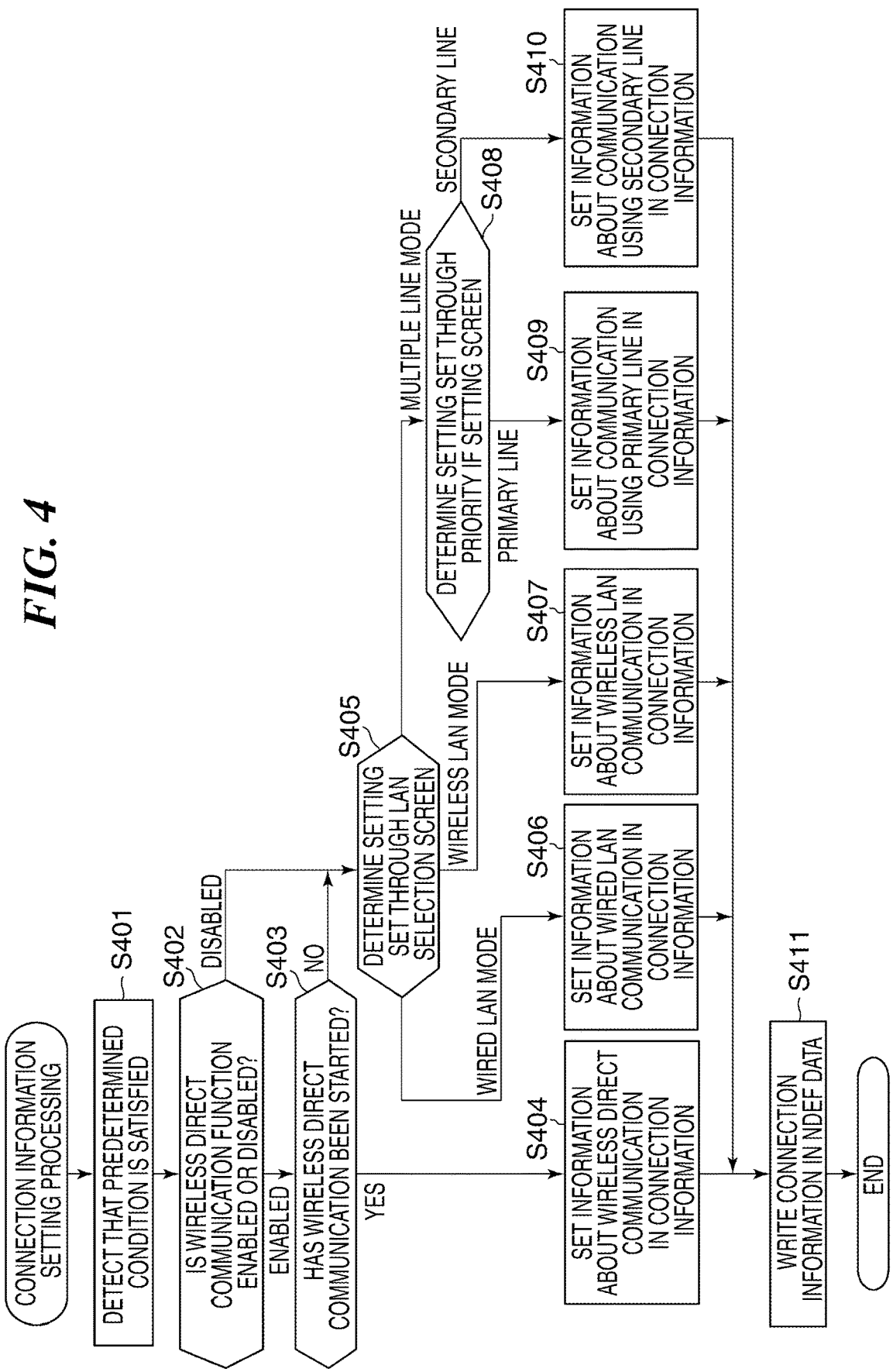
FIG. 4 is a flowchart showing a procedure of connection information setting processing to be executed by the MFP in FIG. 1.

FIG. 4 is a flowchart showing a procedure of connection information setting processing to be executed by the MFP 10 in FIG. 1.

The processing in FIG. 4 is performed by the CPU 202 executing a program stored in the ROM 204. The processing in FIG. 4 is processing for setting address information in NDEF data 600 and the like to be described with FIGS. 6A and 6B to be described later, the NFC data exchange format (NDEF) data 600 being transmitted by NFC communication, which is one example of near field wireless communication.

In FIG. 4, to begin with, when detecting that a predetermined condition is satisfied (step S401), the CPU 202 determines whether the wireless direct communication function is enabled or disabled (step S402). The predetermined condition is, for example, activation of the MFP 10, or setting change performed through any one of the LAN selection screen 301, the wireless direct setting screen 306, and the wireless direct execution instruction screen 309.

In a case where it is determined in step S402 that the wireless direct communication function is enabled, the CPU 202 determines whether or not the wireless direct communication has already been started (step S403).

In a case where it is determined in step S403 that the wireless direct communication has already been started, the CPU 202 sets information about the wireless direct communication in connection information (near field wireless communication information) (step S404). The information about the wireless direct communication includes wireless direct address information such as a wireless direct IP address and MAC address, SSID, and network key. Subsequently, the CPU 202 performs processing at step S411 to be described later.

In a case where it is determined in step S402 that the wireless direct communication function is disabling, or in a case where it is determined in step S403 that the wireless direct communication has not been started, the CPU 202 determines the setting made through the LAN selection screen 301 (step S405). Specifically, in step S405, the CPU 202 determines what setting value indicating out of the wired LAN mode, the wireless LAN mode, and the multiple line mode, has been stored in the HDD 205.

In a case where it is determined in step S405 that the setting value indicating the wired LAN mode has been stored in the HDD 205, the CPU 202 sets information about the wired LAN communication in connection information (step S406). The information about the wired LAN communication is the IP address and MAC address of the MFP 10 to be used in the wired infrastructure (hereinafter referred to as "wired infrastructure address information"). Subsequently, the CPU 202 performs processing of step S411 to be described later.

In a case where it is determined in step S405 that the setting value indicating the wireless LAN mode has been stored in the HDD 205, the CPU 202 sets information about the wireless LAN communication in connection information (step S407). The information about the wireless LAN communication is the IP address and MAC address of the MFP 10 to be used in the wireless infrastructure (hereinafter referred to as "wireless infrastructure address information"). Subsequently, the CPU 202 performs processing of step S411 to be described later.

Figure 5:
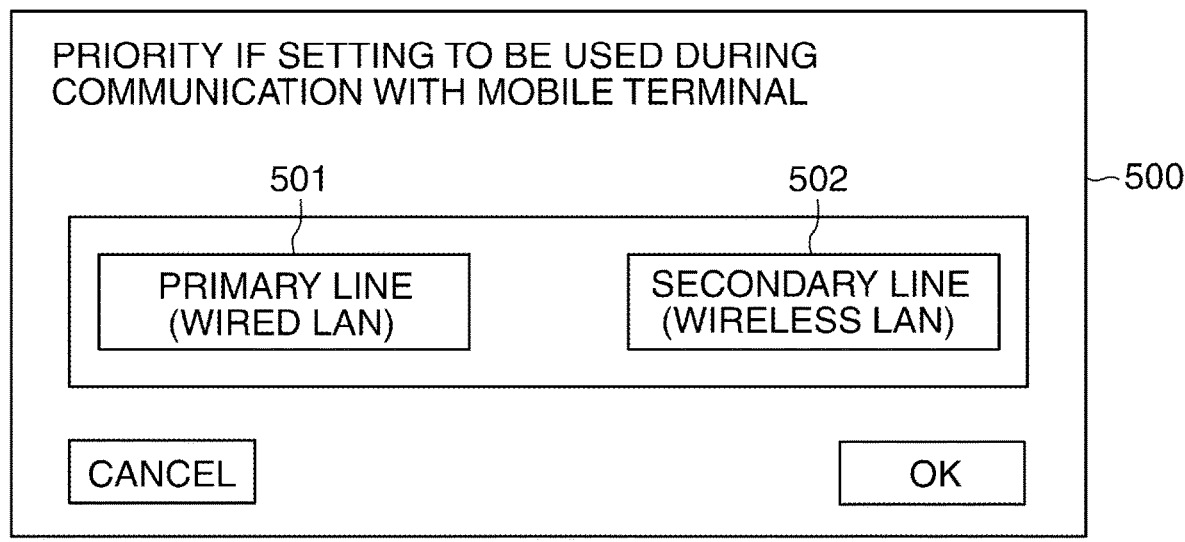
FIG. 5 is a diagram showing one example of a priority IF setting screen displayed on the operation panel in FIG. 2.

In a case where it is determined in step S405 that the setting value indicating the multiple line mode has been stored in the HDD 205, the CPU 202 determines the setting made through a priority IF setting screen 500 in FIG. 5 (step S408).

The priority IF setting screen 500 is a screen for setting a line corresponding to the address information to be set in connection information. The priority IF setting screen 500 includes a primary line button 501 and a secondary line button 502. In a case where the primary line button 501 is selected by the user, the primary line is set as a line corresponding to the address information that is set in connection information in the MFP 10. In a case where the secondary line button 502 is selected by the user, the secondary line is set as a line corresponding to the address information that is set in connection information in the MFP 10.

In step S408, in a case where the user selects the primary line button 501 through the priority IF setting screen 500 to make the setting, the CPU 202 sets information about communication using the primary line in connection information (step S409). The information about communication using the primary line is the IP address and MAC address of the primary line (hereinafter referred to as "primary line address information"). Subsequently, the CPU 202 performs processing in step S411 to be described later.

In step S408, in a case where the user selects the secondary line button 502 through the priority IF setting screen 500 to make the setting, the CPU 202 sets information about communication using the secondary line in connection information (step S410). The information about communication using the secondary line is the IP address and MAC address of the secondary line (hereinafter referred to as "secondary line address information"). Then, the CPU 202 writes the set connection information in the NDEF data (step S411).

Figure 6A:
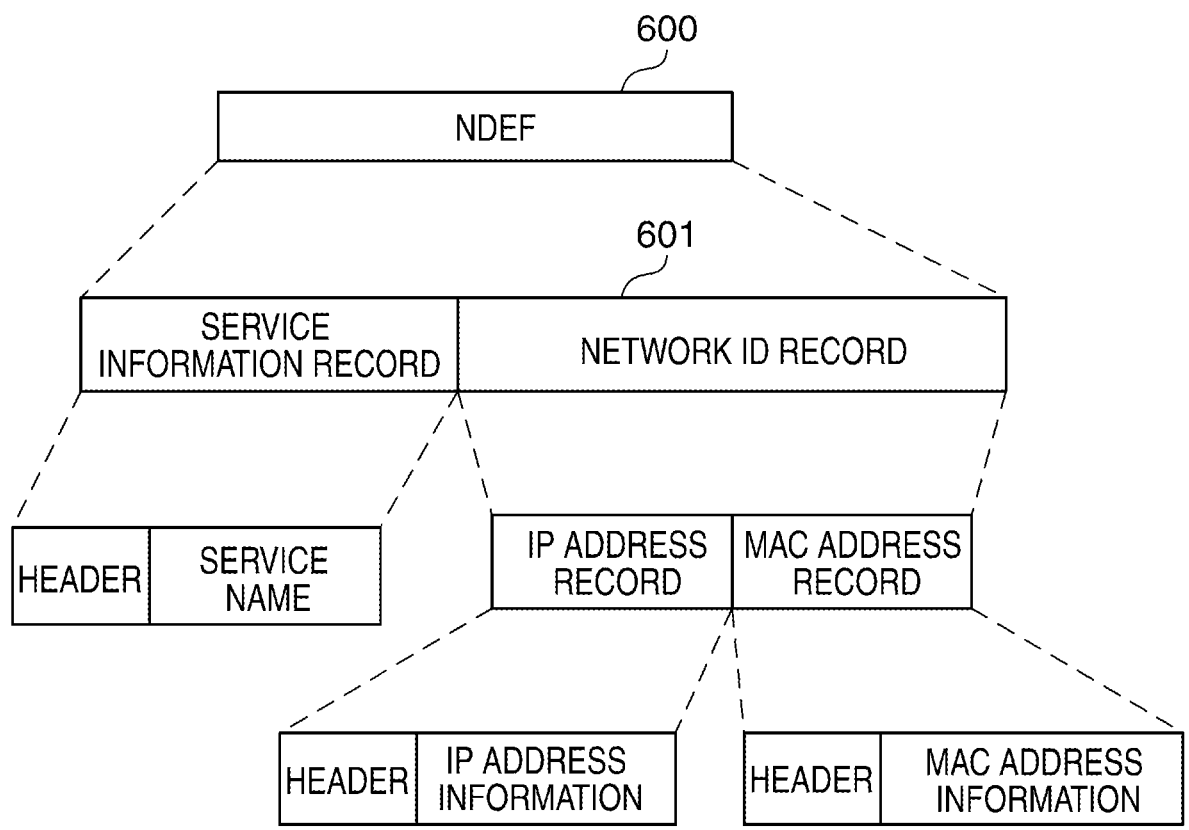
FIGS. 6A and 6B are diagrams for describing a structure of NDEF data transmitted from the MFP in FIG. 1.
Figure 6B:
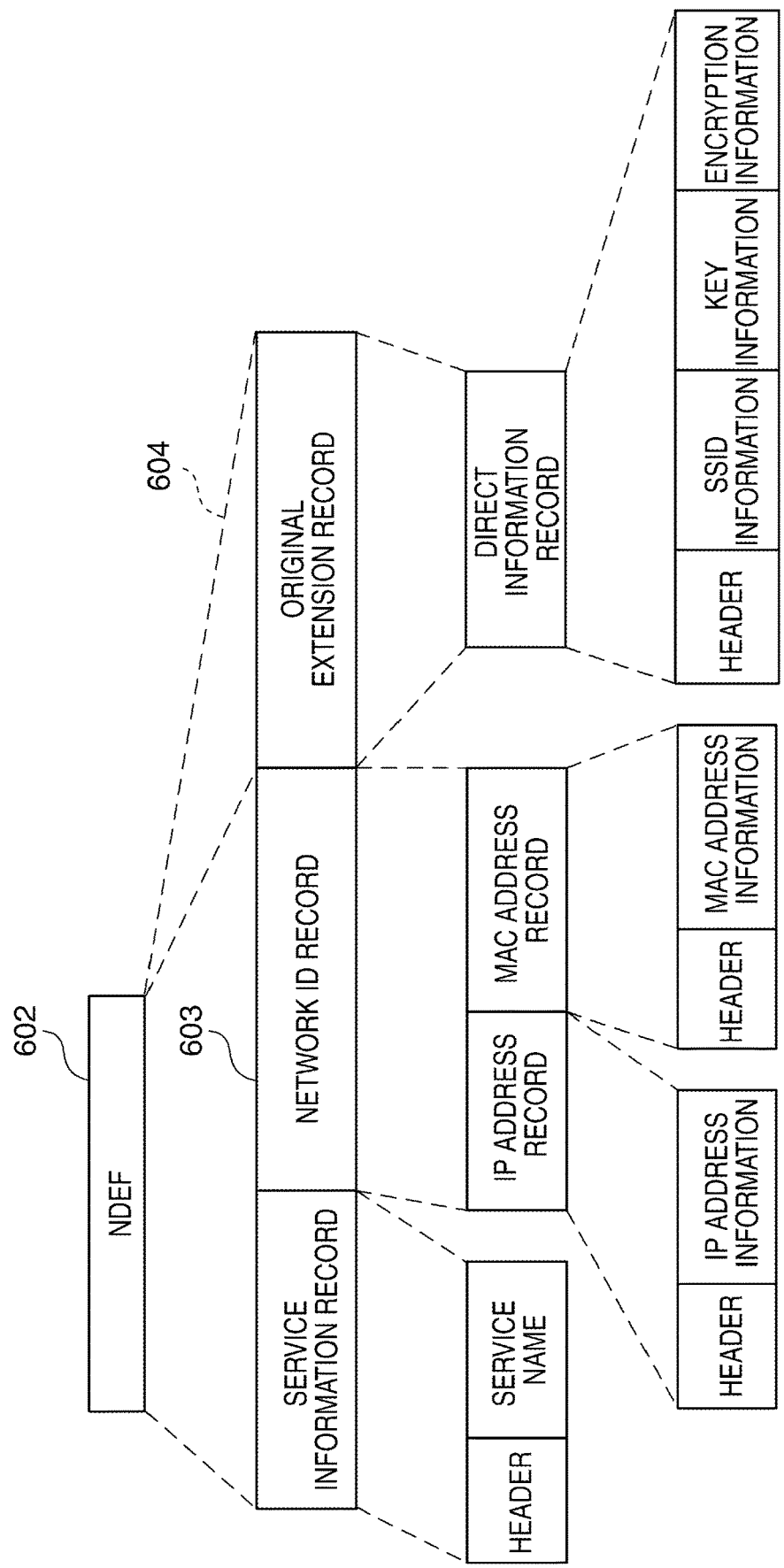

For example, in a case where only address information is set in connection information as in steps S406, S407, S409, and S410, the CPU 202 writes the connection information in the NDEF data 600 which is a data format in FIG. 6A. In the NDEF data 600, the address information is written in a network ID record 601. In a case where the SSID and network key in addition to the address information are set in connection information as in step S404, the CPU 202 writes the connection information in NDEF data 602 which is a data format in FIG. 6B. In the NDEF data 602, the address information is written in a network ID record 603, and the SSID and network key are written in an original extension record 604.

Subsequently, the CPU 202 ends the processing. In a case where the user holds the mobile terminal 11 over an NFC tag (not shown) of the MFP 10 after the processing in FIG. 4 is completed, the NDEF data including the set connection information is transmitted from the MFP 10 to the mobile terminal 11 by NFC communication.

In the processing in FIG. 4 described above, the line corresponding to the address information to be set in the connection information is selected by the user, and the address information of the selected line is set in the connection information. Therefore, it is possible to provide the mobile terminal 11 with the IP address of the line desired by the user.

In the processing in FIG. 4 described above, the near field wireless communication is NFC communication or BLE communication. Therefore, it is possible to transmit the IP address of the line desired by the user to the mobile terminal having an NFC communication function or a BLE communication function.

Furthermore, in the processing of FIG. 4 described above, since the address information is the IP address and the MAC address, it is possible to perform wired LAN communication and wireless LAN communication with the mobile terminal 11 at a higher speed than near field wireless communication.

The present invention has been described above with reference to the above-described embodiment, but the present invention is not limited to the above-described embodiment. For example, the wireless infrastructure may be used as the primary line and the wired infrastructure may be used as the secondary line. Correspondingly, instead of providing the wired LAN (primary)+wireless LAN (secondary) button 304 in the LAN selection screen 301, a wireless LAN (primary)+wired LAN (secondary) button may be provided.

Also, in the above-described embodiment, the priority IF setting screen 500 may include a wireless direct button in addition to the primary line button 501 and the secondary line button 502. In the priority IF setting screen 500, in a case where the wireless direct button is selected by the user, the MFP 10 writes the wireless direct address information in the NDEF data.

Furthermore, in the above-described embodiment, an advertising packet transmitted by BLE communication may be set in connection information.

Figure 7:
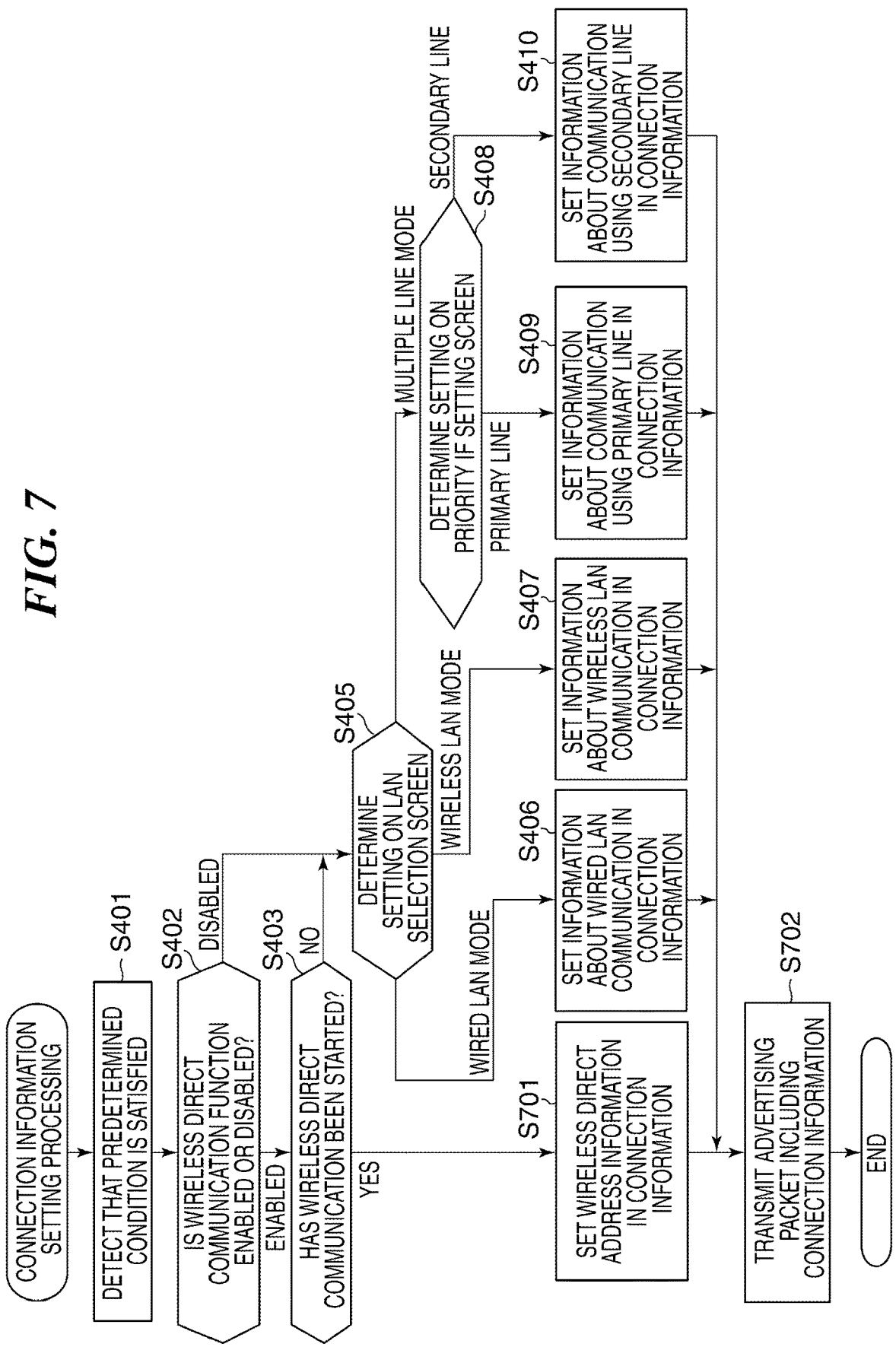
FIG. 7 is a flowchart showing a procedure of a first variation of the connection information setting processing in FIG. 4.

FIG. 7 is a flowchart showing a procedure of a first variation of the connection information setting processing in FIG. 4.

The processing in FIG. 7 is also performed by the CPU 202 executing the program stored in the ROM 204. The processing in FIG. 7 is processing for setting connection information in an advertising packet 800 in FIG. 8 to be described later, the advertising packet 800 being to be transmitted by BLE communication, which is one example of near field wireless communication.

In FIG. 7, the CPU 202 performs the processing in steps S401 to S403.

In a case where it is determined in step S403 that the wireless direct communication has already been started, the CPU 202 sets the wireless direct address information in connection information (step S701). Then, the CPU 202 transmits the advertising packet 800 in FIG. 8 including the connection information to the mobile terminal 11 by BLE communication (step S702). In the advertising packet 800, the MAC address is set as an advertise address 801, and the IP address is set as an advertise payload 802. Subsequently, the CPU 202 ends the processing.

When it is determined in step S403 that the wireless direct communication has not been started, the CPU 202 performs the processing in steps S405 to S410. After performing the processing in steps S406, S407, S409, and S410, the CPU 202 performs the processing in or after step S702 and subsequent steps. When the user brings the mobile terminal 11 closer to the MFP 10 after the processing in FIG. 7 is completed, the advertising packet 800 including the set connection information is transmitted from the MFP 10 to the mobile terminal 11 by BLE communication.

Also, in the above-described embodiment, the connection information may be written in a generic attribute profile (GATT) response by BLE communication.

Figure 9:
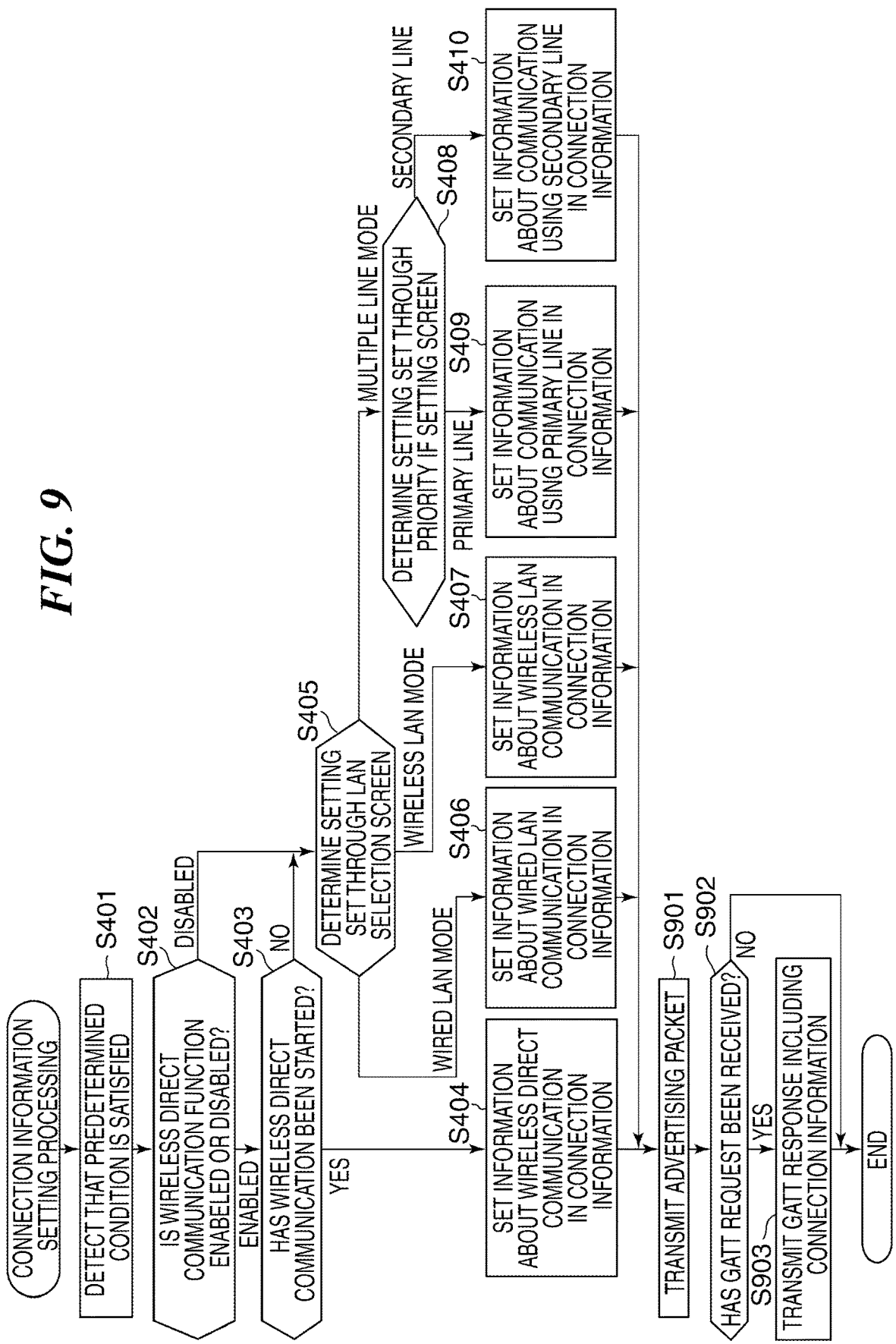
FIG. 9 is a flowchart showing a procedure of a second variation of the connection information setting processing in FIG. 4.

FIG. 9 is a flowchart showing a procedure of a second variation of the connection information setting processing in FIG. 4.

The processing of FIG. 9 is also performed by the CPU 202 executing the program stored in the ROM 204.

In FIG. 9, the CPU 202 performs the processing in steps S401 to S410. Then, the CPU 202 transmits an advertising packet 1000 in FIG. 10A (step S901). The advertising packet 1000 does not include the IP address included in the above-mentioned connection information. Then, the CPU 202 determines whether or not a GATT request, which is a request for transmission of the connection information, has been received from a communication device (step S902). The GATT request includes an ID for specifying a type of connection information to be requested for transmission.

In a case where it is determined in step S902 that the GATT request has not been received, the CPU 202 ends the processing. On the other hand, in a case where it is determined in step S902 that the GATT request has been received from a communication device, for example, the mobile terminal 11, the CPU 202 transmits the GATT response including the connection information corresponding to the received GATT request to the mobile terminal 11 (step S903). In step S902, for example, in a case where the GATT request including an ID "1" corresponding to "the IP address" as shown in FIG. 10B is received from the mobile terminal 11, the CPU 202 transmits the GATT response including the IP address set in the connection information to the mobile terminal 11. Subsequently, the CPU 202 ends the processing.

Furthermore, in the above-described embodiment, the set connection information may be displayed on the operation panel 211.

Figure 11:
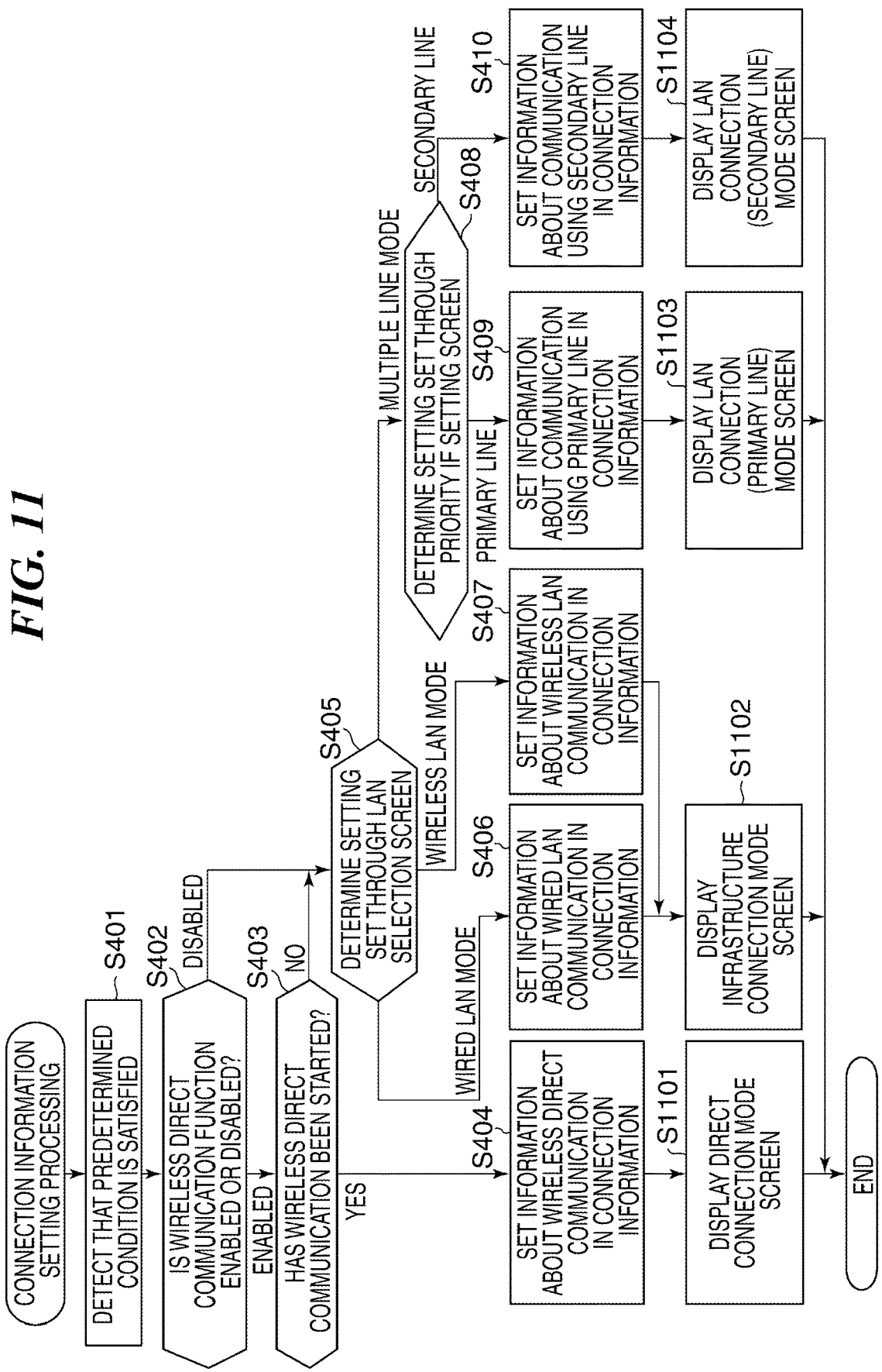
FIG. 11 is a flowchart showing a procedure of a third variation of the connection information setting processing of FIG. 4.

FIG. 11 is a flowchart showing a procedure of a third variation of the connection information setting processing in FIG. 4.

Figure 12:
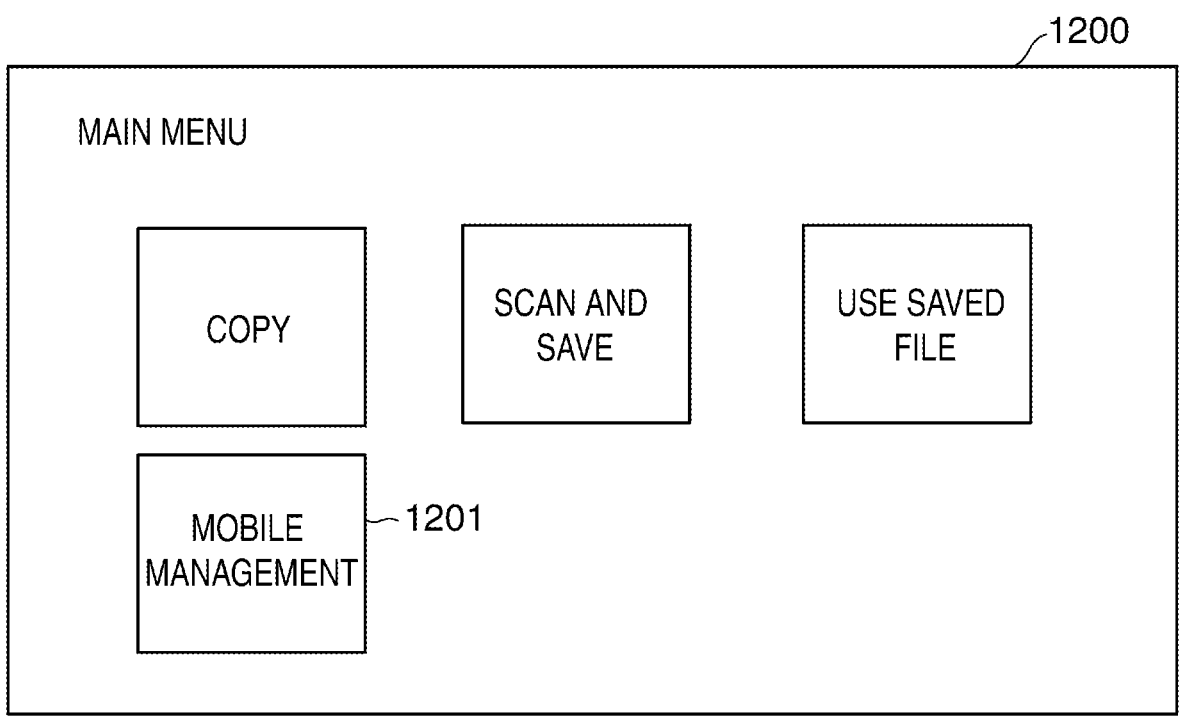
FIG. 12 is a diagram showing one example of a menu screen displayed on the operation panel in FIG. 2.
Figure 13A:
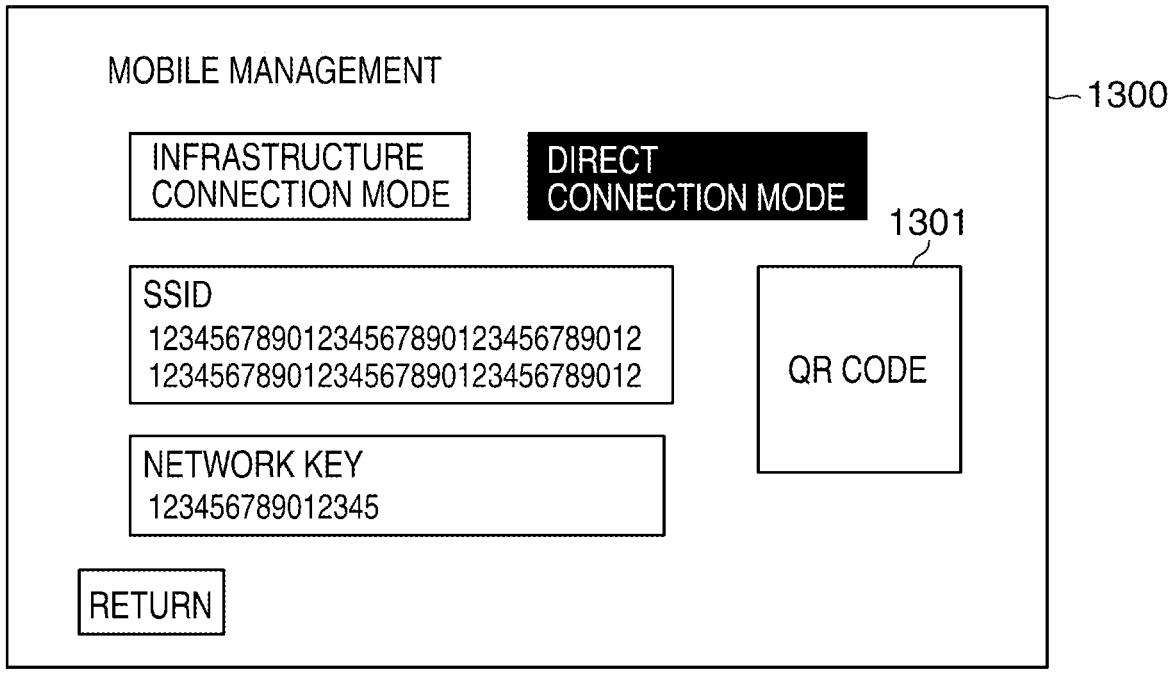
FIGS. 13A to 13D are diagrams each showing an example of each mode screen displayed on the operation panel in FIG. 2.
Figure 13B:
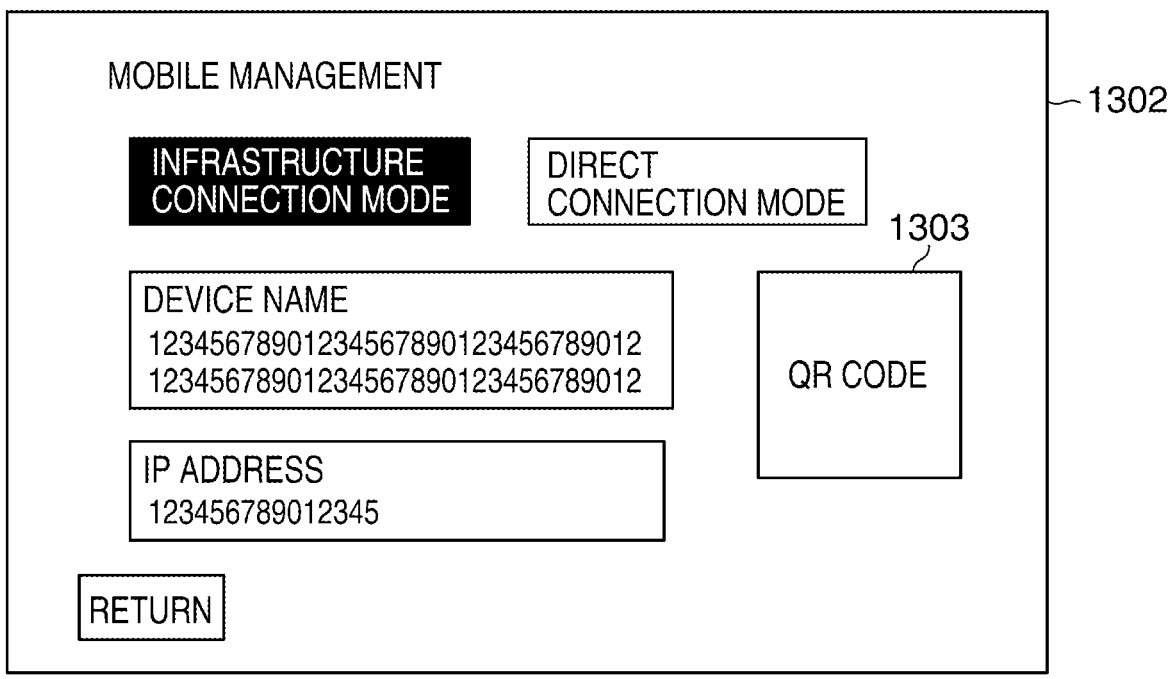
Figure 13C:
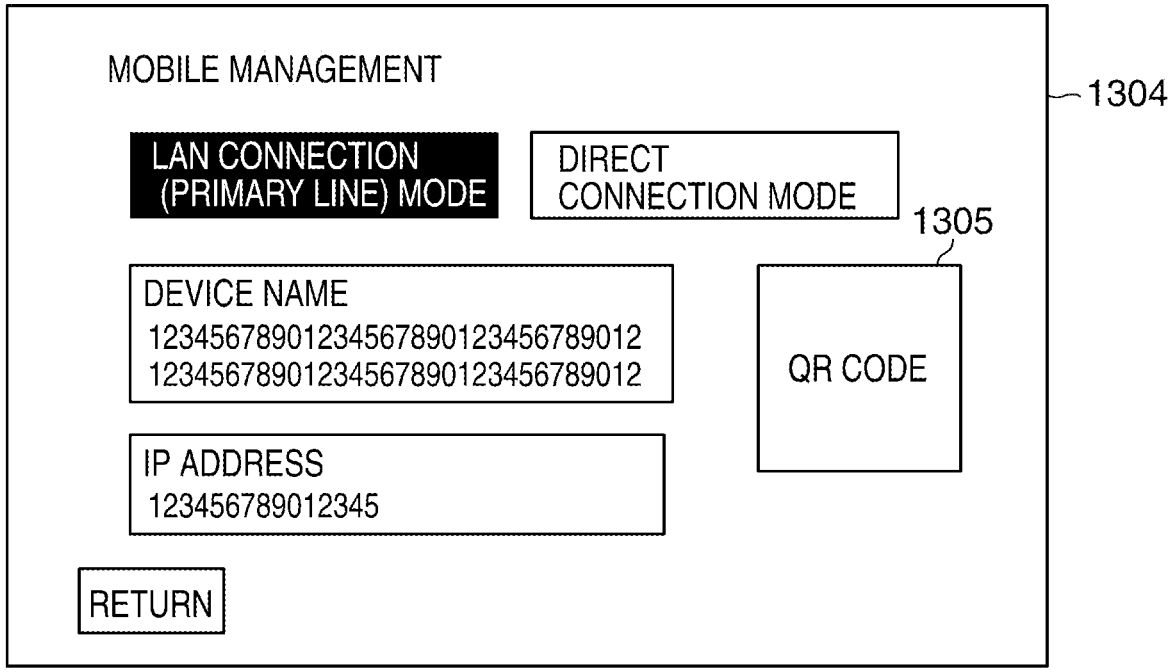
Figure 13D:
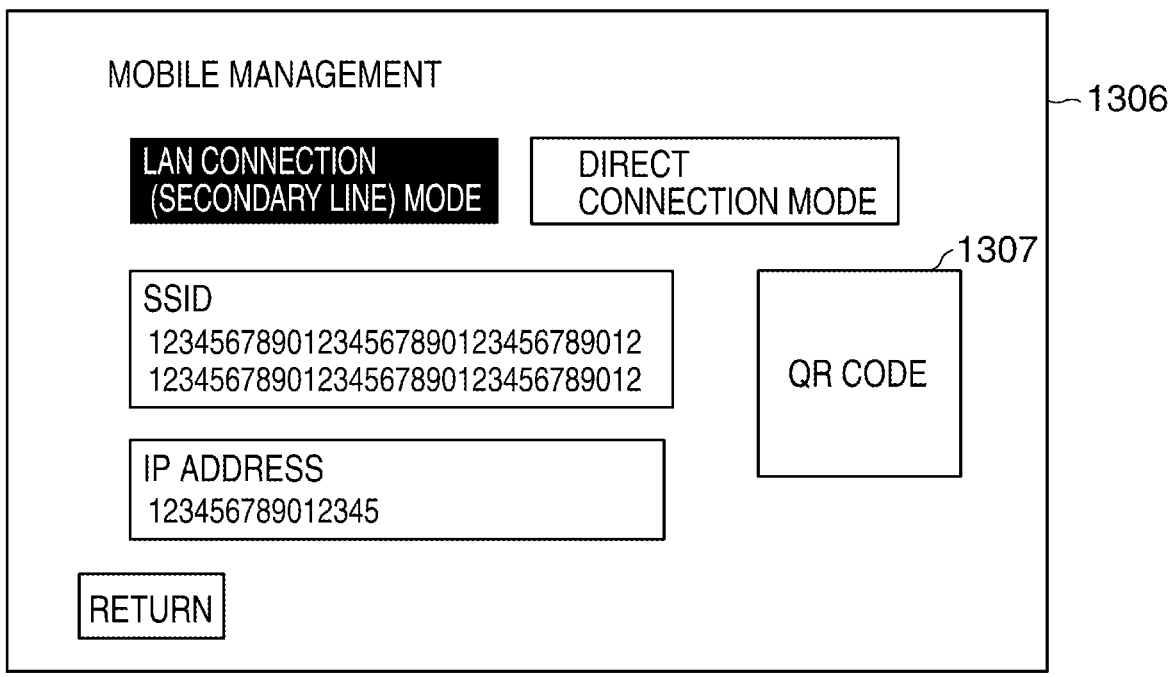

The processing in FIG. 11 is also performed by the CPU 202 executing the program stored in the ROM 204. The processing in FIG. 11 assumes that a menu screen 1200 in FIG. 12 is displayed on the operation panel 211. A plurality of buttons including a mobile management button 1201 is displayed in the menu screen 1200. In a case where the mobile management button 1201 is selected by the user, one of mode screens in FIGS. 13A to 13D to be described later is displayed on the operation panel 211. It should be noted that in the processing in FIG. 11, the CPU 202 performs the processing in steps S401 to S410 in the processing in FIG. 4. In the processing of FIG. 11, each processing after steps S404, S406, S407, S409, and S410 is different from the processing in FIG. 4. Only processing different from the processing of FIG. 4 will be described below.

In FIG. 11, the CPU 202 performs the processing in step S404. Subsequently, in a case where the mobile management button 1201 is selected by the user, the CPU 202 displays a direct connection mode screen 1300 in FIG. 13A on the operation panel 211 (step S1101). In the direct connection mode screen 1300, the connection information set in step S404 and a QR code (registered trademark) 1301 including the connection information are displayed. By reading the displayed QR code 1301, the mobile terminal 11 acquires the wireless direct address information included in the connection information set in step S404. Subsequently, the CPU 202 ends the processing.

The CPU 202 performs the processing in step S406 or S407. Subsequently, in a case where the mobile management button 1201 is selected by the user, the CPU 202 displays an infrastructure connection mode screen 1302 in FIG. 13B on the operation panel 211 (step S1102). In the infrastructure connection mode screen 1302, the connection information set in step S406 or S407 and a QR code 1303 including the connection information are displayed. For example, in a case where the connection information is set in the processing in step S406, by reading the displayed QR code 1303, the mobile terminal 11 acquires the wired infrastructure address information included in the connection information set in step S406. Subsequently, the CPU 202 ends the processing.

The CPU 202 performs the processing of step S409. Subsequently, in a case where the mobile management button 1201 is selected by the user, the CPU 202 displays a LAN connection (primary line) mode screen 1304 in FIG. 13C on the operation panel 211 (step S1103). In the LAN connection (primary line) mode screen 1304, the connection information set in step S409 and a QR code 1305 including the connection information are displayed. By reading the displayed QR code 1305, the mobile terminal 11 acquires the primary line address information included in the connection information set in step S409. Subsequently, the CPU 202 ends the processing.

The CPU 202 performs the processing in step S410. Subsequently, in a case where the mobile management button 1201 is selected by the user, the CPU 202 displays a LAN connection (secondary line) mode screen 1306 in FIG. 13D on the operation panel 211 (step S1104). In the LAN connection (secondary line) mode screen 1306, the connection information set in step S410 and a QR code 1307 including the connection information are displayed. By reading the displayed QR code 1307, the mobile terminal 11 acquires the secondary line address information included in the connection information set in step S410. Subsequently, the CPU 202 ends the processing.

Since the set connection information is displayed in the processing in FIG. 11 described above, before acquiring the connection information from the MFP 10 with the mobile terminal 11 by near field wireless communication, the user can confirm whether or not the address information desired by the user can be acquired.

Also, in the processing of FIG. 11 described above, the QR code including the set address information is displayed. With this configuration, even in a situation where the mobile terminal 11 cannot execute near field wireless communication because of poor radio wave conditions, it is possible to acquire the desired address information by the user reading the displayed QR code by using the mobile terminal 11.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-176992, filed Sep. 14, 2017, which is hereby incorporated by reference wherein in its entirety.

What is claimed is:

1. An information processing apparatus capable of communicating with an external apparatus, the information processing apparatus comprising:
at least one short range wireless communication interface;
a first network interface;
a second network interface;
at least one memory that stores a set of instructions; and
at least one processor that executes the instructions to cause the information processing apparatus to perform operations comprising:
setting as an operation setting of the information processing apparatus, based on a user's operation performed via a setting screen displayed on a display device, whether information on the first network interface is to be notified by using the short range communication or information on the second network interface is to be notified by using the short range communication;
determining whether or not a direct wireless communication function has already started up in the information processing apparatus, wherein the direct wireless communication function is a function for providing a communication path through which IP communication is performed between the information processing apparatus and the external apparatus without via an external relay apparatus;
in a case where a second operation setting is set so as to use the first network interface and the second network interface, and it is determined that the direct wireless communication function has not started up in the information processing apparatus, setting an IP address assigned to one of the first network interface and the second network interface as information to be notified to outside by the at least one short range wireless communication interface based on the set operation setting; and
in a case where the second operation setting is set so as to use the first network interface and the second network interface, and it is determined that the direct wireless communication function has already started up in the information processing apparatus, setting connection information which includes information for establishing the communication path through which the IP communication is performed and which includes neither the IP address assigned to the first network interface nor the IP address assigned to the second network interface, as the information to be notified to outside by the at least one short range wireless communication interface.

2. The information processing apparatus according to claim 1, wherein the at least one short range wireless communication interface includes a Bluetooth low energy (Bluetooth LE) communication interface.

3. The information processing apparatus according to claim 2, wherein the at least one short range wireless communication interface further includes a NFC interface that having a NFC tag,
wherein the NFC interface and the Bluetooth LE communication interface notify the external apparatus of the set information to be notified to outside.

4. The information processing apparatus according to claim 1, wherein the information processing apparatus displays the set information to be notified to outside.

5. The information processing apparatus according to claim 1, wherein the information processing apparatus displays a QR code including the set information to be notified to outside.

6. The information processing apparatus according to claim 1, wherein the connection information further includes a MAC address of a network interface corresponding to one of the first network interface and the second network interface set based on the operation setting.

7. The information processing apparatus according to claim 1, wherein the information processing apparatus is an image forming apparatus that performs image forming processing.

8. The information processing apparatus according to claim 1, further comprising:
a wireless network communicator; and
a wired network communicator,
wherein the wireless network communicator functions as the second network interface which is connecting with a secondary network provided by an external access point and functions as the direct wireless communication function,
wherein the wired network communicator functions as the first network interface which is connecting with a primary network, and
wherein the second network interface includes specified predetermined restrictions on communication.

9. The information processing apparatus according to claim 1, wherein the set connection information includes a Service Set Identifier (SSID) and a network key used for direct wireless communication.

10. The information processing apparatus according to claim 1, wherein the first network interface is used as a primary network interface that connects to a primary network and the second network interface is used as a secondary network interface that connects to a secondary network,
wherein the second network interface includes specified predetermined restrictions on communication, that are not included on the first network interface used as the primary network interface.

11. The information processing apparatus according to claim 1, wherein the operations further comprising:
in accordance with reception of a user's operation to shift the direct wireless communication function to stop state in a state where the direct wireless communication function has already started up, changing the information to be notified to outside by the at least one short range wireless communication interface from the connection information to the IP address assigned to one of the first network interface and the second network interface determined based on the set operation setting.

12. The information processing apparatus according to claim 1, wherein the operations further comprising:
setting whether to permit use of the wireless direct communication function based on the user's operation,
wherein the IP address assigned to one of the first network interface and the second network interface determined based on the set operation setting is set as the information to be notified to outside in a case where a setting not to permit the use of the wireless direct communication function is set; or in a case where a setting to permit the use of the wireless direct communication function is set and the wireless direct communication function has not started up.

13. A method for controlling an information processing apparatus capable of communicating with an external apparatus, and includes at least one short range wireless communication interface, a first network interface, and a second network interface, the method comprising:
setting as an operation setting of the information processing apparatus, based on a user's operation performed via a setting screen displayed on a display device, whether information on the first network interface is to be notified by using the short range communication or information on the second network interface is to be notified by using the short range communication;
determining whether or not a direct wireless communication function has already started up in the information processing apparatus, wherein the direct wireless communication function is a function for providing a communication path through which IP communication is performed between the information processing apparatus and the external apparatus without via an external relay apparatus;
in a case where a second operation setting is set so as to use the first network interface and the second network interface, and it is determined that the direct wireless communication function has not started up in the information processing apparatus, setting an IP address assigned to one of the first network interface and the second network interface as information to be notified to outside by the at least one short range wireless communication interface based on the set operation setting; and
in a case where the second operation setting is set so as to use the first network interface and the second network interface, and it is determined that the direct wireless communication function has already started up in the information processing apparatus, setting connection information which includes information for establishing the communication path through which an IP communication is performed and which includes neither the IP address assigned to the first network interface nor the IP address assigned to the second network interface, as the information to be notified to outside by the at least one short range wireless communication interface.

14. A non-transitory storage medium storing a program for causing a computer to execute a method for controlling an information processing apparatus capable of communicating with an external apparatus, and includes at least one short range wireless communication interface, a first network interface, and a second network interface, the method comprising:
setting as an operation setting of the information processing apparatus, based on a user's operation performed via a setting screen displayed on a display device, whether information on the first network interface is to be notified by using the short range communication or information on the second network interface is to be notified by using the short range communication;

determining whether or not a direct wireless communication function has already started up in the information processing apparatus, wherein the direct wireless communication function is a function for providing a communication path through which IP communication is performed between the information processing apparatus and the external apparatus without via an external relay apparatus;

in a case where a second operation setting is set so as to use the first network interface and the second network interface, and it is determined that the direct wireless communication function has not started up in the information processing apparatus, setting an IP address assigned to one of the first network interface and the second network interface as information to be notified to outside by the at least one short range wireless communication interface based on the set operation setting; and in a case where the second operation setting is set so as to use the first network interface and the second network interface, and it is determined that the direct wireless communication function has already started up in the information processing apparatus, setting connection information which includes information for establishing the communication path through which an IP communication is performed and which includes neither the IP address assigned to the first network interface nor the IP address assigned to the second network interface, as the information to be notified to outside by the at least one short range wireless communication interface.

* * * * *